United States Patent
Wood

(10) Patent No.: US 7,502,169 B2
(45) Date of Patent: *Mar. 10, 2009

(54) CONTRAST ENHANCEMENT FILMS FOR DIRECT-VIEW DISPLAYS AND FABRICATION METHODS THEREFOR

(75) Inventor: Robert L. Wood, Apex, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 221 days.

This patent is subject to a terminal disclaimer.

(21) Appl. No.: 11/364,423

(22) Filed: Feb. 28, 2006

(65) Prior Publication Data

US 2007/0127098 A1   Jun. 7, 2007
US 2007/0247684 A2   Oct. 25, 2007

Related U.S. Application Data

(60) Provisional application No. 60/748,271, filed on Dec. 7, 2005.

(51) Int. Cl.
G02B 27/10 (2006.01)

(52) U.S. Cl. .................. 359/619; 359/738; 345/32

(58) Field of Classification Search .......... 359/738, 359/619, 621, 627
See application file for complete search history.

(56) References Cited

U.S. PATENT DOCUMENTS

| | | | |
|---|---|---|---|
| 4,172,219 A | 10/1979 | Deml et al. | |
| 5,598,281 A | 1/1997 | Zimmerman et al. | |
| 6,633,351 B2 * | 10/2003 | Hira et al. | 349/95 |
| 6,760,086 B2 * | 7/2004 | Hattori et al. | 349/122 |
| 6,781,733 B1 * | 8/2004 | Hira | 359/237 |
| 6,788,460 B2 | 9/2004 | Knox et al. | |
| 6,816,306 B2 | 11/2004 | Freese et al. | |
| 6,829,087 B2 | 12/2004 | Freese et al. | |
| 6,967,779 B2 | 11/2005 | Fadel et al. | |
| 7,420,742 B2 * | 9/2008 | Wood et al. | 359/619 |
| 2002/0039157 A1 | 4/2002 | Nakanishi et al. | |
| 2003/0206342 A1 | 11/2003 | Reed et al. | |
| 2004/0017612 A1 | 1/2004 | Fadel et al. | |
| 2005/0058947 A1 | 3/2005 | Rinehart et al. | |

(Continued)

FOREIGN PATENT DOCUMENTS

EP   1 670 024 A2   6/2006

(Continued)

OTHER PUBLICATIONS

Notification of Transmittal of the International Search Report and the Written Opinion of the International Searching Authority, or the Declaration; International Search Report; and Written Opinion of the International Searching Authority, PCT/US2006/046454, Mar. 27, 2007.

Primary Examiner—Jordan M. Schwartz
(74) Attorney, Agent, or Firm—Myers Bigel Sibley & Sajovec, P.A.

(57) ABSTRACT

Contrast enhancement films for a direct-view display include a substrate having first and second opposing sides, an array of optical microstructures on the first side, and an optically blocking film including an array of apertures on the second side. The contrast enhancement film is configured to mount between a direct-view display panel and an outer panel of the direct-view display.

27 Claims, 9 Drawing Sheets

U.S. PATENT DOCUMENTS

| | | |
|---|---|---|
| 2005/0058948 A1 | 3/2005 | Freese et al. |
| 2005/0058949 A1 | 3/2005 | Wood et al. |
| 2005/0236987 A1 | 10/2005 | Okazaki et al. |
| 2005/0253493 A1 | 11/2005 | Park et al. |
| 2006/0061869 A1* | 3/2006 | Fadel et al. ............... 359/619 |
| 2006/0176569 A1* | 8/2006 | Yoshida et al. ............. 359/626 |
| 2007/0002452 A1* | 1/2007 | Munro ..................... 359/627 |
| 2008/0043337 A1* | 2/2008 | Kobayashi et al. .......... 359/619 |

FOREIGN PATENT DOCUMENTS

| | | |
|---|---|---|
| JP | 2001154597 | 6/2001 |

* cited by examiner

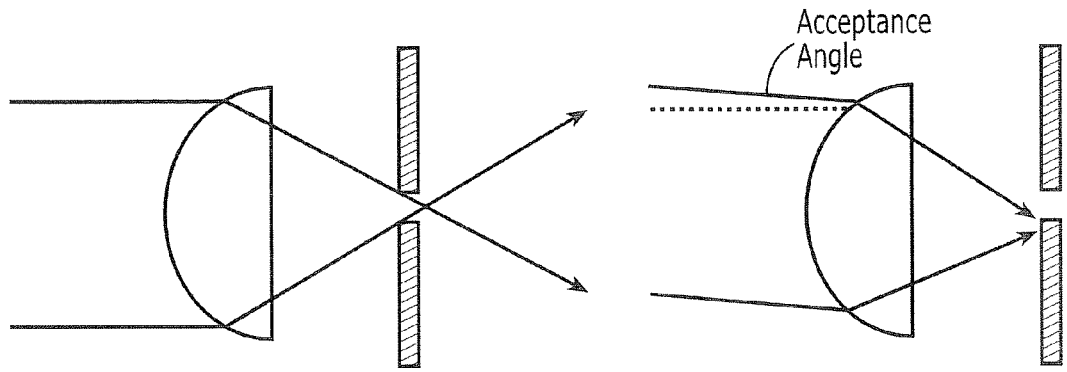
FIG. 1A
FIG. 1B
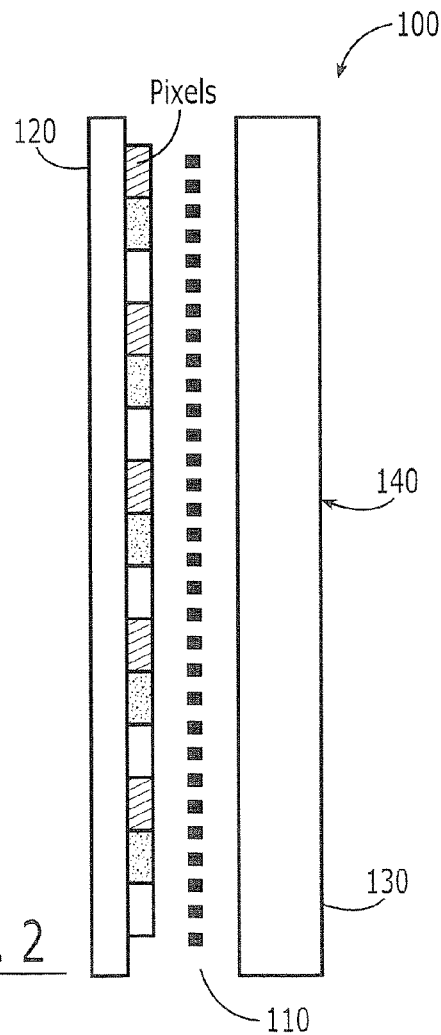
FIG. 2

CONTRAST ENHANCEMENT FILMS FOR DIRECT-VIEW DISPLAYS AND FABRICATION METHODS THEREFOR

CROSS-REFERENCE TO RELATED APPLICATION

This application claims the benefit of provisional Application Ser. No. 60/748,271, filed Dec. 7, 2005, entitled Contrast Enhancement Films for Direct-View Displays and Fabrication Methods Therefor, assigned to the assignee of the present application, the disclosure of which is hereby incorporated herein by reference in its entirety as if set forth fully herein.

FIELD OF THE INVENTION

This invention relates to optical systems, devices, processes and fabrication methods, and more particularly to contrast enhancement films, systems and operations using same, and methods of fabricating same.

BACKGROUND OF THE INVENTION

The quality of direct-view displays based on conventional technologies such as Cathode Ray Tube (CRT), plasma, Organic Light Emitting Diode (OLED) and direct-view Liquid Crystal Display (LCD), can suffer from the effects of ambient light. Light from extraneous sources such as lighting and windows may impinge on the screen and reflect toward viewers in a manner that can reduce the contrast and viewability of the image. Plasma displays in particular are prone to this problem owing to their relatively low brightness compared with CRT and LCD.

Various approaches to solving this problem have been deployed over the years. For example, the glass envelope on CRT television screens is tinted gray to improve image contrast in ambient light. In these CRT screens, ambient light reaching the screen and reflecting from the internal phosphor and shadow mask layers undergoes absorption twice: once when entering the display and once when exiting. Thus, image light produced by the phosphors undergoes attenuation in proportion to the screen absorbance, while ambient light undergoes twice that amount of attenuation. This can provide an improvement in viewability even though the total image brightness may be reduced, typically by as much as 50%, by the gray glass.

Unlike direct-view displays, rear-projection displays may make use of microlens arrays coupled with apertures in a "black matrix" to form discrete spatial filters capable of providing very high contrast and ambient light rejection. This approach has been used with displays in which imaging light is substantially collimated prior to passing through the screen.

Applying this method to direct-view screens having a Lambertian-like light distribution (generally covering a full hemisphere of view angles) may have the undesirable effect of cutting out a substantial portion of the light, with a loss of brightness. In particular, due to the limited acceptance angle of the microlens/aperture combination with a finite aperture size, such a combination can only pass light incident within a specified range of input angle. Light arriving outside this range misses the aperture and, in the case of a black matrix aperture layer, is absorbed. Since direct-view screens such as plasma and LCD televisions have Lambertian-like light distributions, spatial filtering of the display using a lens/aperture combination that is used for rear-projection displays can cause dramatic and unacceptable loss of brightness.

Another potential problem of using micro-optical films on direct-view displays is the difficulty in mounting such films. Conventional adhesive methods may not be appropriate because the adhesive used can cause index-matching problems with the micro-optical element, which may dramatically reduce or even eliminate the optical power of that element. Creating an air-gap between the display and film may be undesirable due to potential compromise of mechanical rigidity and stability. Thus, even if such a micro-optical film could be made to pass light efficiently, it may still pose difficulties in assembly.

SUMMARY OF THE INVENTION

Some embodiments of the invention provide contrast enhancement films for direct-view display panels having a direct view display and an outer panel that provides an outer surface for the direct-view display. These contrast enhancement films can include a substrate having first and second opposing sides, an array of optical microstructures on the first side of the substrate, and an optically blocking film including an array of apertures therein on the second side of the substrate, wherein the array of apertures are in registry with the array of optical microstructures. The contrast enhancement film is configured to mount between the direct-view display panel and the outer panel. In some embodiments, the array of optical microstructures comprises an array of horizontally extending lenticular lenses. In some embodiments, the array of optical microstructures define a nonplanar surface, and the contrast enhancement film also includes a cladding layer on the nonplanar surface of the optical microstructures. The cladding layer includes a planar surface opposite the nonplanar surface of the optical microstructures. In some embodiments, the cladding layer has a different index of refraction than the optical microstructures.

In some embodiments, the optically blocking film comprises a black layer including the array of apertures therein. In other embodiments, the optically blocking film also includes a reflective layer that includes the array of apertures therein, on the black layer, opposite the substrate. In these embodiments, the direct-view display panel may be modified to include a reflective surface. In still other embodiments of the invention, a second array of optical microstructures is provided on the optically blocking film opposite the array of first optical microstructures. In yet other embodiments, the direct-view display panel is configured to emit Lambertian optical radiation and the contrast enhancement film is configured to convert the Lambertian optical radiation to at least partially collimated radiation.

Many bonding configurations may be provided according to various embodiments of the invention. In some embodiments, a bonding substrate is provided on the array of optical microstructures opposite the substrate. An adhesive layer is provided on the bonding substrate that is configured to mount the contrast enhancement film on the direct-view display panel between the direct-view display panel and the outer panel. In other embodiments, the bonding substrate may be provided on the cladding layer, and the adhesive layer may be provided on the bonding substrate. In still other embodiments, the array of optical microstructures includes an adhesive surface that is configured to mount the contrast enhancement film on the direct-view display panel between the direct-view display panel and the outer panel.

Moreover, the reflective layer may perform diverse purposes according to some embodiments of the invention. In some embodiments, in addition to reflecting optical radiation produced by the direct-view display panel, the reflective layer may also suppress electromagnetic interference that is emitted by the direct-view display panel. In other embodiments, the reflective layer is configured to carry electric signals that are used to operate the direct-view display panel.

Other embodiments of the invention provide other contrast enhancement films for direct-view displays having a direct-view display panel and an outer panel that provides an outer surface for the direct-view display. These contrast enhancement films include a first substrate having first and second opposing sides. An array of optical microstructures is provided on the first side of the substrate to define a nonplanar surface. A black layer including an array of apertures therein, is provided on the second side of the substrate. A reflective layer including the array of apertures therein is also provided on the black layer opposite the substrate. A cladding layer is provided on the nonplanar surface of the optical microstructures. The cladding layer includes a planar surface opposite the nonplanar surface of the optical microstructures. An adhesive layer is provided on the reflective layer and is configured to mount the contrast enhancement film on the direct-view display panel between the direct-view display panel and the outer panel. The cladding layer may have a lower index of refraction than the optical microstructures. The array of optical microstructures may comprise an array of horizontally extending lenticular microlenses and the reflective layer may provide different functions, as was described above.

Contrast enhancement films according to yet other embodiments of the present invention include a substrate having first and second opposing sides, a black layer including an array of apertures therein on the second side of the substrate and a reflective layer including the array of apertures therein on the black layer opposite the substrate. An adhesive layer is provided on the reflective layer, and is configured to mount the contrast enhancement film on the direct-view display panel, between the direct-view display panel and the outer panel thereof. The array of optical microstructures may comprise an array of horizontally extending lenticular microlenses and the reflective layer may be configured to provide multiple functions, as was described above.

Contrast enhancement methods, according to some embodiments of the present invention, directly pass a first portion of light that is emitted from a direct-view display panel through apertures in a reflective layer and apertures in a black layer. A second portion of light that is emitted from the direct-view display panel is reflected from the reflective layer back to the direct-view display panel one or more times, and then through the apertures in the reflective layer and the apertures in the black layer. The first and second portions of light that emerge from the apertures in the black layer are then passed through an array of optical microstructures and through the outer panel.

Contrast enhancement films may be fabricated, according to some embodiments of the present invention, by forming an array of optical microstructures on a first side of the substrate and forming an optically blocking film on the second side of the substrate opposite the first side. High intensity radiation is impinged through the array of optical microstructures and through the substrate onto the optical blocking film, such that the radiation that impinges on the optically blocking film forms apertures in the optically blocking film. An adhesive layer is placed on the substrate that is configured to mount the contrast enhancement film on the direct-view display panel, between the direct-view display panel and the outer panel.

BRIEF DESCRIPTION OF THE DRAWINGS

FIGS. 1A and 1B schematically illustrate an effect of spatial filters with variation in acceptance angle.

FIG. 2 is a cross-sectional view of a direct-view display including a contrast enhancement film according to some embodiments of the present invention.

DETAILED DESCRIPTION

Figure 3A:
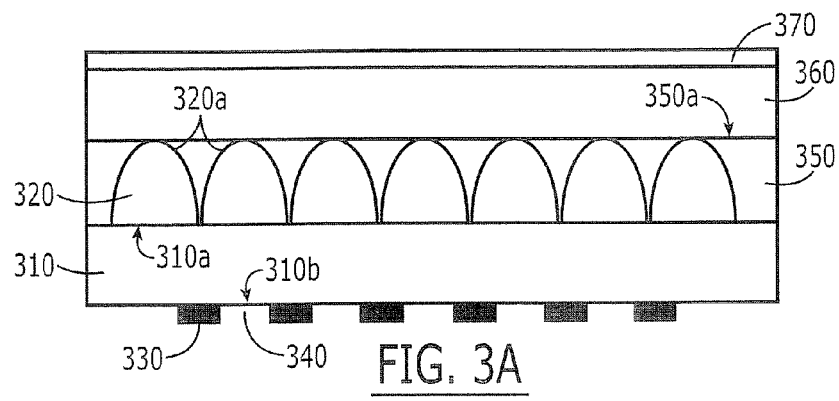
FIGS. 3A and 3B are cross-sectional views of contrast enhancement films according to some embodiments of the present invention from a structural and optical perspective, respectively.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "having," "having," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Finally, when light is referred to as "directly passing," it means that a reflector-free path is provided.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. Moreover, the terms "front" and "back" may be used herein to describe opposing outward faces of a display screen. Conventionally, the viewing face is deemed the front, but the viewing face may also be deemed the back, depending on orientation. Finally, the terms "horizontal" and "vertical" indicate specific orientations based upon the ultimate orientation of the direct-view display.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the invention can provide a film that may be included in a direct-view display such as a CRT, plasma, OLED and/or LCD display to allow improved ambient light rejection and contrast. Furthermore, in some embodiments, these films are capable of being applied to the display such that the entire area of the film is adhesively attached to an inner portion of the display, allowing mechanical rigidity, uniformity and/or stability.

The films described herein can improve contrast in a direct-view display through the process of spatial filtering. Light from the display side can be efficiently gathered by refractive microstructures such as microlenses on the film surface and channeled through apertures in a light-absorbing layer adjacent to the lens surface. The light absorbing layer can efficiently absorb light arising from ambient sources outside of the display, while the apertures can permit efficient passage of display light toward the viewing side.

Embodiments of the invention can provide for efficient collection of light from the Lambertian-like display, and can provide for attachment of the film to the display in a manner that preserves its optical functionality. Spatial filters generally work well for collimated sources, such that light is transmitted therethrough, as shown in FIG. 1A, but are generally ineffective for Lambertian sources, i.e. sources that radiate light into a hemisphere of emission angles. This is due to the low acceptance angle of a conventional spatial filter, such that light is absorbed, as shown in FIG. 1B.

Some embodiments of the invention use optical microstructures in combination with a light absorption layer having apertures therein. Some embodiments make use of a first optical microstructure layer on one side of a substrate and a second optical microstructure layer on the opposite side of the substrate, with a light absorbing layer positioned between the two optical microstructure layers. Other embodiments employ only one optical microstricture layer that may be on either the source side or the viewing side of the substrate. Some embodiments make use of one or more optical microstructure layers in which a second layer is applied as an over-layer or cladding layer of the optical microstructure layer. This over-layer or cladding layer may have a refractive index that is different from the optical microstructure layer. Yet other embodiments employ an absorber layer that may be made of a black material, including carbon. Yet other absorber layers may include composite layers including a black absorber layer and a bright metallic reflective layer. Some embodiments include an electrically conductive layer that can act as an ElectroMagnetic Interference (EMI) filter, also known as a Radio Frequency Interference (RFI) filter, suitable for use in, for example, a plasma display panel, and/or as a plurality of signal carrying conductors.

FIG. 2 shows a general implementation of a contrast enhancement film 110 for a direct-view display 100 according to exemplary embodiments of the invention. The direct-view display 100 includes a direct-view display panel 120 and an outer panel 130 that provides an outer surface or "viewer side" 140 for the direct-view display 100. The contrast enhancement film 110 will generally be adhesively applied to the display panel 120, for example the plasma panel in the case of a Plasma Display Panel (PDP) television, or an LCD panel in the case of a LCD television or computer display. The outer panel 130 will generally be clamped at its edges, and may include an antireflection layer and/or antiglare layer on its outer surface. The outer panel 130 provides mechanical rigidity and protection of the inner display components 120. A contrast enhancement film 110 according to exemplary embodiments of the present invention, and shown in FIG. 2 generally collects light from the display panel 120 and can efficiently pass this light to the viewing side 140, while blocking ambient light from the viewing side 140. The contrast enhancement film 110 may also help provide the display surface with a dark gray or black appearance.

Various embodiments of the invention will now be illustrated with respect to FIGS. 3A-9B. These embodiments shall be regarded as merely illustrative and shall not be construed as limiting the invention. Moreover, the embodiments described and illustrated herein may be combined in various combinations and subcombinations.

Figure 3B:
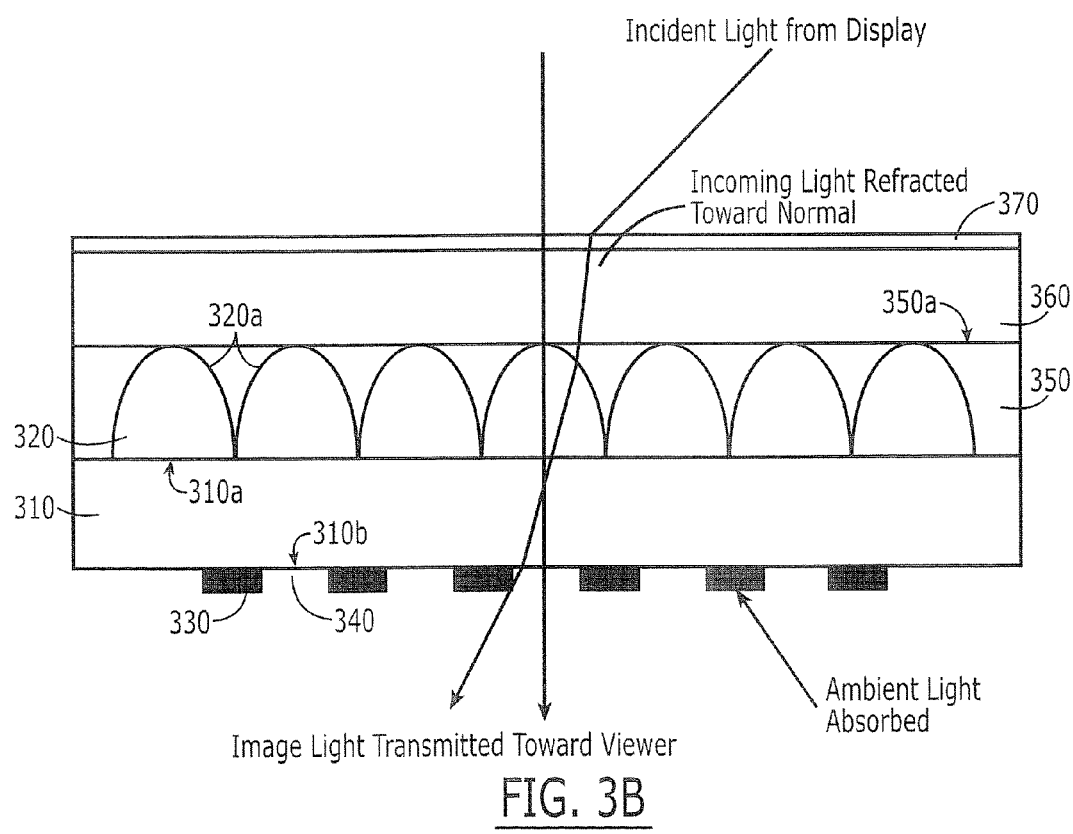

FIGS. 3A and 3B are cross-sectional views of contrast enhancement films according to some embodiments of the present invention from a structural and optical perspective, respectively. More specifically, referring to FIGS. 3A and 3B, a first substrate 310 includes first and second opposing sides (faces) 310a, 310b, respectively. An array of optical microstructures 320 is provided on the first side 310a of the first substrate 310. It will be understood by those having skill in the art that, in some embodiments, the first substrate 310 is integrated with the optical microstructures 320, and may actually be embodied as the base of the optical microstructures 320. An optically blocking film 330, including an array of apertures 340 therein, is provided on the second side 310b of the first substrate 310. The array of apertures 340 are in registry with the array of optical microstructures 320. For example, in some embodiments, a respective aperture is centered (aligned) on a respective axis of a respective optical microstructure. In other embodiments, a respective aperture may be offset from a respective axis. Multiple apertures per optical microstructure may also be provided. The apertures may be of any shape, including circular, ellipsoidal, polygonal and/or elongated (striped).

In some embodiments of the invention, the array of optical microstructures 320 comprises an array of horizontally extending lenticular microlenses, such as cylindrical section microlenses as illustrated in FIGS. 3A and 3B. It has been found, according to some embodiments of the present invention, that horizontally extending lenticular microlenses can reduce or eliminate acceptance angle issues with Lambertian sources, so that embodiments of the present invention can be used as contrast enhancement films for direct-view displays. The horizontally extending lenticular microlenses may be contrasted with conventional vertically extending lenticular microlens arrays that may be used for other display applications. Moreover, in still other embodiments, the lens geometry may be optically weakened, as described below, so as to create larger apertures 340 in the optically blocking film 330 and thereby also increase the acceptance angle for a Lambertian source.

Still continuing with the description of FIG. 3A, the array of optical microstructures 320 defines a nonplanar surface 320a. A cladding layer 350 is provided on the nonplanar surface 320a of the optical microstructures 320. The cladding layer 350 includes a planar surface 350a opposite the nonplanar surface 320a of the optical microstructures 320. In some embodiments, the cladding layer 350 has a different index of refraction, such as a lower index of refraction, than the optical microstructures 320. For example, the optical microstructures 320 may have an index of refraction (N) of about 1.5, and the cladding layer 350 may have an index of refraction of about 1.4.

Still referring to FIG. 3A, a second substrate 360 may be provided on the planar surface 350a of the cladding layer 350. An adhesive 370 may be provided on the second substrate 360. The adhesive 370 may be mounted on a display panel 120, so that the contrast enhancement film extends between the direct-view display panel 120 and the outer panel 130. In other embodiments, the second substrate 360 need not be provided, and the adhesive 370 may be provided directly on the planar surface 350a of the cladding layer 350. One or more intervening layers also may be provided. Moreover, in other embodiments, the adhesive 370 may be provided to mount the contrast enhancement film in the outer panel of the display.

A contrast enhancement film having a structure shown in FIG. 3A may be constructed by microreplicating an optical microstructure layer 320 having an array of cylindrical or lenticular lens-like projections on one side of a 50 μm thick polyester base first substrate 310. Other substrate materials that could be used include polycarbonate film, acrylic film, acetate film and glass, among others. Individual convex lens-like projections may be approximately 80 μm in width and about 50 μm in height. The lens-like projections may be replicated from a master using a photopolymer with cured refractive index of about 1.50. The lens-like projections may be fabricated as described in published U.S. Patent Application Nos. 2005/0058947; 2005/0058948; 2005/0058949 and/or 2003/00206342; and/or U.S. Pat. Nos. 6,967,779; 6,788, 460; 6,829,087 and/or 6,816,306, the disclosures of which are hereby incorporated herein by reference in their entirety as if set forth fully herein. The optical microstructures 320 need not be limited to lens-like projections, but may also take many other forms such as prisms and complex polyhedra as well as combinations of shapes. Other techniques and materials may be used for replicating the microstructures. Some of these include injection molding, embossing, calendaring, thermoplastic and thermoset resins, and room temperature vulcanizing one-part and two-part systems.

This optical microstructure layer may be over-layered with a planar cladding layer 350 having a refractive index of, for example, about 1.4 by flowing a room temperature-vulcanizing silicone composition between the optical microstructure layer and a planar sheet of polyester having a thickness of about 175 μm followed by curing at room temperature. Other cladding materials that may be used include higher index polymers such as polystyrene, novolak resin, polyhydroxystyrene, polycarbonates and/or polysulfones; and lower refractive index materials such as various siloxane-containing polymers and fluoro- and perfluoroacrylate polymers and/or copolymers. In the case of higher index cladding material 350, the optical microstructures 320 may be in the form of concave lens-like projections. The optical microstructures 320 need not be limited to lens-like projections, but may also take many other forms such as prisms and complex polyhedra as well as combinations of shapes.

The surface opposite the over-layered optical microstructure may be coated with a 4 μm thickness of carbon black 330 in an organic binder. Other light-absorbing layers, referred to herein as "black" layers, can be used such as titanium carbide, tantalum nitride, anodized aluminum, and the like. The carbon black layer 330 may be exposed to high-energy laser pulses with a wavelength of 1.0 μm from a YAG laser source, with the laser impinging on the optical microstructure side (the top of FIG. 3A). The optical microstructures 320, modified by the cladding layer 350, cause weak focusing or convergence of laser light into bright zones in the carbon black layer 330. This creates "shadowed" zones between the bright zones. Carbon in the bright zones is ejected due to the absorption of laser energy within these zones, creating apertures 340 in registry with each optical microstructure. The carbon layer in the shadowed zones remains intact. The apertures may be fabricated, for example, as described in U.S. Pat. Nos. 6,967, 779 and/or 4,172,219.

The composite film is mounted to a Lambertian-like display with the optical microstructure side (the top of FIG. 3A) towards the direct-view display panel 120 and the carbon black layer 330 toward the viewer side 140. As shown in FIG. 3B, light arriving from the display panel 120 that falls within the acceptance angle of the optical microstructure/aperture combination is passed through the aperture 340 and on toward the viewer. Ambient light falling on the screen is attenuated by direct absorption in the carbon black layer 330.

The cladding layer 350 in the film of FIGS. 3A and 3B may be chosen to have a refractive index that differs from that of the optical microstrictures 320, and has high optical transparency. The difference in refractive index may typically be 0.1 or greater. The refractive index difference determines the ability of the optical microstructures 320 to cause refraction of the incoming light. This refraction may be performed in order to form bright zones and shadowed zones in the carbon black layer 330. Where the cladding layer 350 has a higher refractive index than the optical microstructures 320, the optical microstructures may take the form of concave lens-like projections. Conversely, when the cladding layer 350 has an index less than the microstructures 320, it may take the form of convex lens-like projections. Overlaying the cladding layer 350 provides a planar upper surface for attachment of a bonding substrate 360, which can be a transparent carrier layer having an adhesive backing 370 for attachment to the display. In this example, a polyester bonding substrate 360 with 7 mil thickness is used. Other bonding substrate materials may be used, such as glass, polycarbonate film, acrylic film, acetate film, and/or the like.

The upper surface of this bonding substrate may be covered with a conventional pressure-sensitive adhesive 370 for attachment to the display panel 120. Alternatively, the planar cladding planar surface 350a may be directly attached to a display surface using a separate transparent adhesive layer 370. Without the cladding 350, attachment to the display may be very difficult to accomplish without severely degrading the refractive power of the optical microstructure 320. The cladding layer 350 in the film of FIGS. 3A and 3B also can help to re-orient incoming light toward the normal, as shown in FIG. 3B, which can improve the likelihood that image light will fall within the acceptance angle of the optical microstructure/ aperture combination. The cladding layer 350 also can weaken the optical microstructure power considerably, thereby reducing its convergence in the black layer 330. This can result in larger apertures 340, which in turn can improve the acceptance angle of the optical microstructure/aperture combination. These effects can combine to provide high efficiency and good ambient light blocking capability on a Lambertian-like source.

Figure 4A:
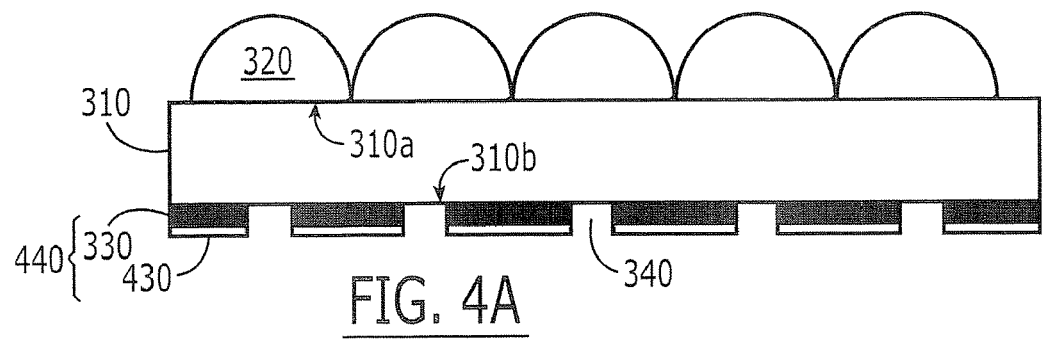
FIGS. 4A and 4B are cross-sectional views of contrast enhancement films according to other embodiments of the present invention from a structural and optical perspective, respectively.
Figure 4B:
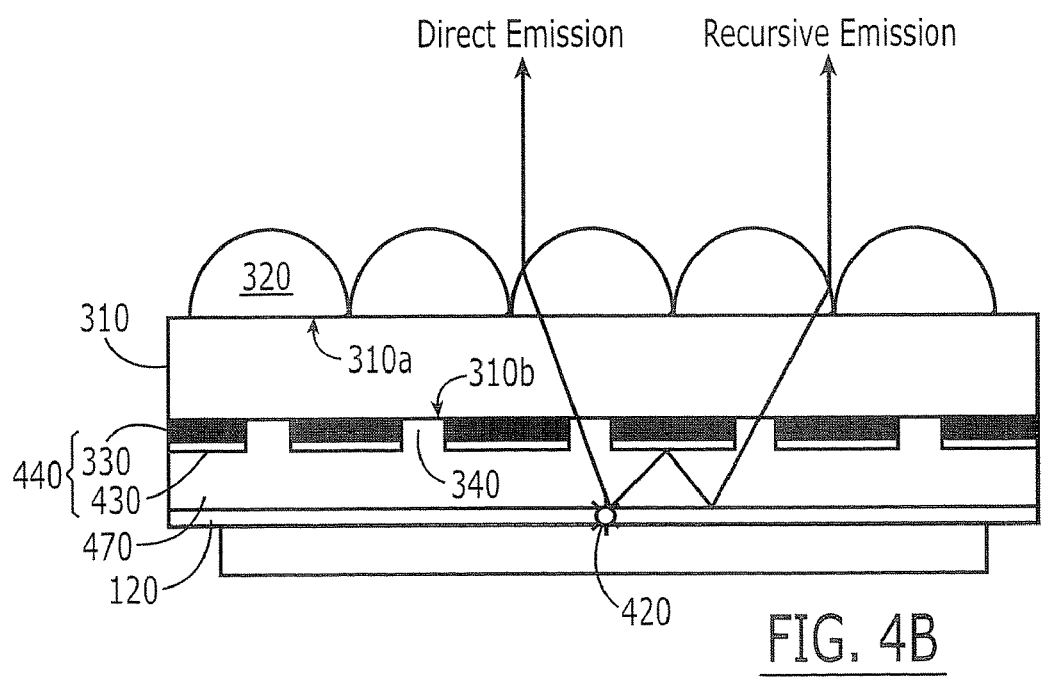

FIGS. 4A and 4B are cross-sectional views of a contrast enhancement film according to other embodiments of the present invention from a structural and an optical perspective, respectively. In these embodiments, the optically blocking layer 440 includes a black layer 330 including the array of apertures 340 therein, and a reflective layer 430, such as an aluminum layer, that also includes the array of apertures 340 therein, on the black layer 330 opposite the substrate 310.

A contrast enhancement film having a structure shown in FIGS. 4A and 4B may be constructed by microreplicating an optical microstructure layer 320 having an array of cylindrical or lenticular lens-like projections on one side of a 50 μm thick polyester base substrate. The optical microstructure need not be limited to lens-like projections, but may also take many other forms such as prisms and complex polyhedra as well as combinations of shapes. Other substrate materials that could be used include polycarbonate film, acrylic film, acetate film and glass, among others. Individual lens-like projections may be approximately 80 μm in width and about 50 μm in height. The lens-like projections may be replicated from a master using a photopolymer with cured refractive index of about 1.50. The lens-like projections may be fabricated as described in published U.S. Patent Application Nos. 2005/0058947; 2005/0058948; 2005/0058949 and/or 2003/ 00206342; and/or U.S. Pat. Nos. 6,967,779; 6,788,460; 6,829,087; and/or 6,816,306, the disclosures of which are hereby incorporated herein by reference in their entirety as if set forth fully herein. Other techniques and materials may be used for replicating the microstructures. Some of these include injection molding, embossing, calendaring, thermoplastic and thermoset resins, and room temperature vulcanizing one-part and two-part systems.

The surface 310b opposite the over-layered optical microstructure may be coated with a 4 μm thickness of carbon black 330 in an organic binder. Other light-absorbing layers can be used such as titanium carbide, tantalum nitride, anodized aluminum, and the like. The outer surface of the carbon black layer 330 may be coated with 200 nm of evaporated aluminum 430. Other reflective materials may be used, including silver, chromium, nickel, multilayer dielectric reflection enhancing structures and/or combinations thereof.

The composite carbon black/aluminum layer 440 may be exposed to high-energy laser pulses with a wavelength of 1.0 μm from a YAG laser source, with the laser impinging on the optical microstructure side (the top of FIG. 4A). The optical microstructures cause localized convergence of laser light in "bright" zones that are in registry with individual optical microstructures. In this example, the bright zones are formed directly beneath one or more lens-like projection(s) by exposing the film from a direction perpendicular to the plane of the film. In other embodiments, the bright zones may be formed at locations that are offset from the lens-like projections by exposing the film from directions other than perpendicular to the plane of the film. In yet other embodiments, multiple exposures from one or more directions, which may or may not include a perpendicular direction, may be used to create multiple bright zones beneath a lens-like projection. Areas between bright zones are "shadow" zones where exposure intensity is much lower than in "bright" zones. The carbon black/aluminum film 440 in the bright zones is ejected due to absorption of laser energy, forming a transmissive aperture 340 corresponding to the bright zone. In some embodiments, the amount of carbon/aluminum ejected from the bright areas may be equivalent to 20% of the total area. Other area fractions could be used, for example, a smaller aperture area (area fraction of carbon/aluminum removed by the laser) may blacken the display with a narrower view angle, while a larger aperture area may provide a less black display with a wider view angle. The apertures may be fabricated as described in U.S. Pat. Nos. 6,967,779 and/or 4,172,219.

As shown in FIG. 4B, the composite film thus exposed is mounted on the surface of a Lambertian-like display 120 with the aperture layer 440 toward the display surface and the optical microstructure layer 320 toward the viewer. The attachment may be provided by an adhesive layer 470 between the optically blocking film 440 and the display panel 120, which can also extend into the apertures 340. As shown in FIG. 4B, image light 420 arriving at the contrast enhancement film from the aperture side either directly passes through the aperture and is then relayed toward the viewer by the optical microstructure ("direct emission"), or it is reflected back toward the display by the aluminum layer 430. Light reflected by the aluminum layer 430 may then undergo additional reflections ("recursive emission") within the display, e.g. from the surface of the phosphor layer in the case of a CRT or plasma display, and then redirected once again toward the aluminum aperture layer 430. Following multiple recursive reflections, substantially all of the light may eventually pass through the apertures 340 and on toward the viewer. The efficiency of the film of FIGS. 4A and 4B can be further enhanced by intentionally increasing or maximizing the reflectivity of the underlying display components such as the phosphor materials and/or supporting structure. The film thereby can provide efficient throughput from source to viewer. From the viewing side (top of FIGS. 4A/4B), the carbon black layer 330 can absorb ambient light falling on the film surface and thereby can enhance contrast of the image. The optical microstructures may be designed to provide desired horizontal and vertical viewing angles, in some embodiments.

FIG. 4B illustrates two reflections from the image light 420 of the display 120 through the aperture 340. However, recursive emission according to other embodiments of the present invention may take place one or more times. Moreover, in other embodiments of the present invention, recursive emission of FIG. 4B may be enhanced by modifying the direct-view display panel 120 to provide a reflective surface, such as the outer surface, thereof. Typically, in order to reduce glare and/or improve contrast, the surface of a direct-view display panel may be provided with a light-absorbing layer. However, in order to enhance recursive emission according to some embodiments of the present invention, the direct-view display panel 120 may be made reflective.

Figure 4C:
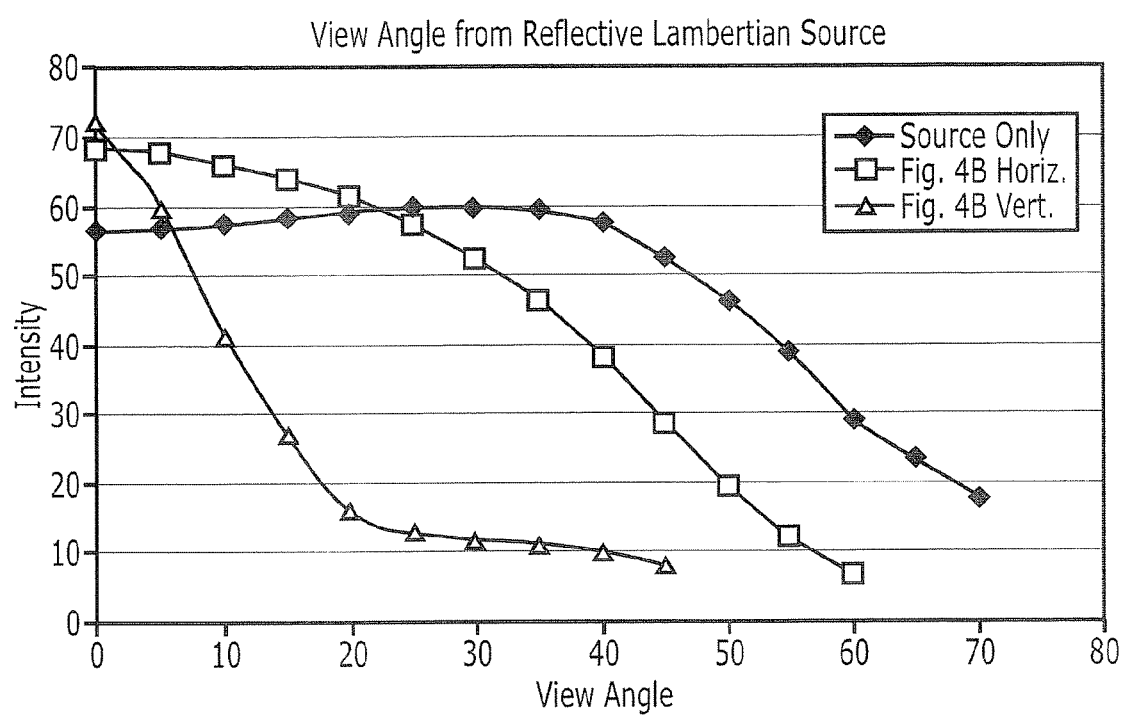
FIG. 4C graphically illustrates intensity as a function of view angle for embodiments of FIGS. 4A and 4B.

As shown in FIG. 4C, the contrast enhancement film of FIG. 4B can produce efficient transfer of light to the viewer, particularly through the horizontal viewing range, generally the most important consideration for a television display. As shown in FIG. 4C, the film produces on-axis gain, which means the display is actually brighter to a viewer seated in front of the display that it otherwise would be without the film installed. This gain is produced at the expense of vertical view angle, due to the collimating property of the lens-like optical microstructures.

Embodiments of contrast enhancement films of FIGS. 4A/4B can have a potential advantage of easier mounting, since the aperture side is attached to the display surface rather than the optical microstructure side. This mounting may avoid the need to index-match the optical microstructure. Embodiments of FIGS. 4A and 4B may also provide more contrast benefit, since the film can still be effective even with a high coverage of black. This is because the constriction of FIGS. 4A and 4B need not be constrained by the acceptance angle of the lens/aperture combination.

Embodiments of FIGS. 4A and 4B (and/or other embodiments herein) can serve the dual purpose of acting an RFI/EMI shield for the display, due to the high conductivity of the aluminum layer 430. This permits consolidation of RFI/EMI shielding into the contrast enhancement film, which can reduce cost and simplify construction. Current approaches to RFI/EMI shielding in plasma televisions may use an additional discrete layer. Moreover, in other embodiments, the aluminum layer 430 may be patterned to allow the reflective layer 430 to carry electric signals that are used to operate the direct-view display panel 120. For example, pixel activating signals may be carried. One or more additional patterned conductive layers comprising transparent conductors, such as indium tin oxide, also may be provided between the substrate 310 and the display panel 120, to carry additional signaling. Thus, row and column signals may be carried by the reflective layer 430 and an orthogonally extending transparent conductive layer, in some embodiments.

Figure 9A:
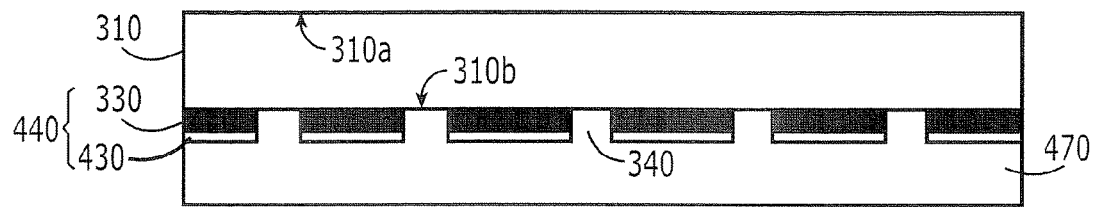
Figure 9B:
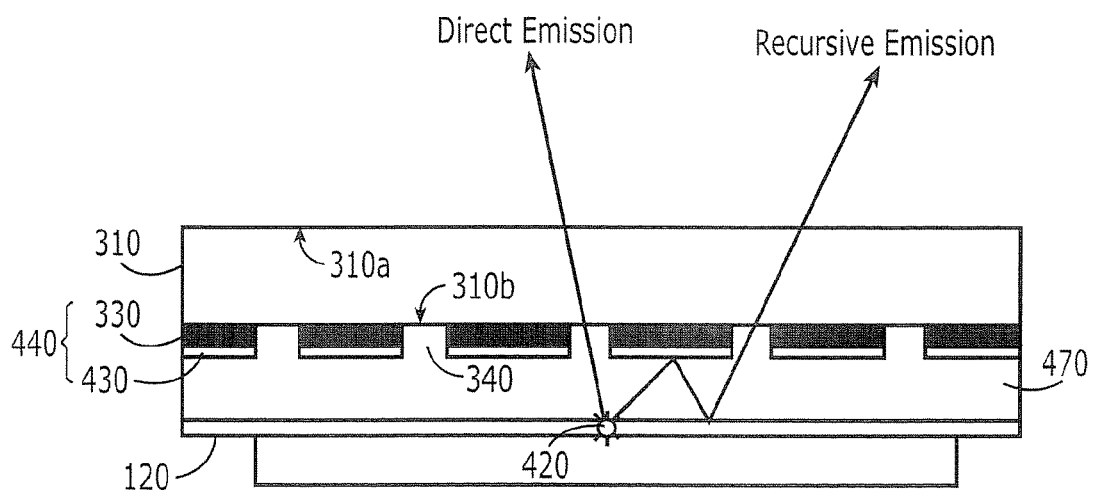

As shown in FIGS. 9A and 9B, in other embodiments, the optical microstructure layer of FIGS. 4A/4B need not be provided. Rather, the contrast enhancement film of these embodiments may be provided via the composite black 330/reflective 430 layer, including apertures therein 340, as illustrated in FIGS. 9A/9B. By eliminating the optical microstructure layer 320 of FIGS. 4A/4B, a potentially lower cost alternative may be provided, albeit at potentially lower performance.

Figure 5A:
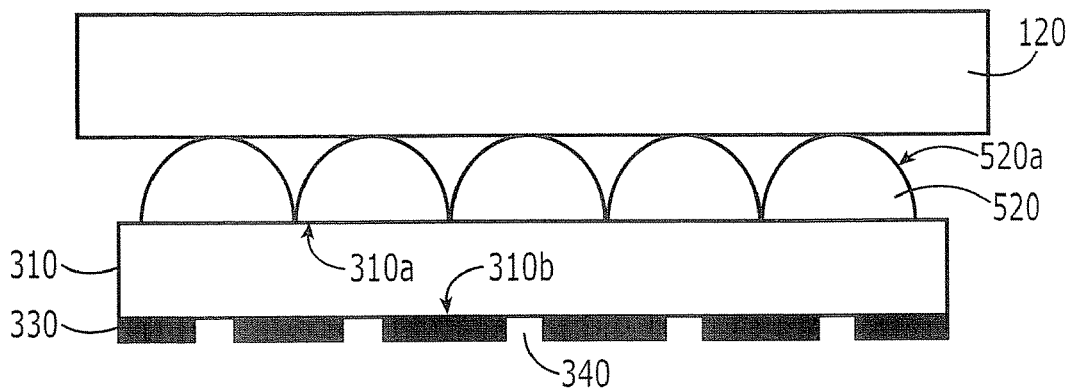
FIGS. 5A-5B, 6A-6B, 7A-7B, 8A-8B and 9A-9B are cross-sectional views of contrast enhancement films according to still other embodiments of the present invention from structural and optical perspectives, respectively.
Figure 5B:
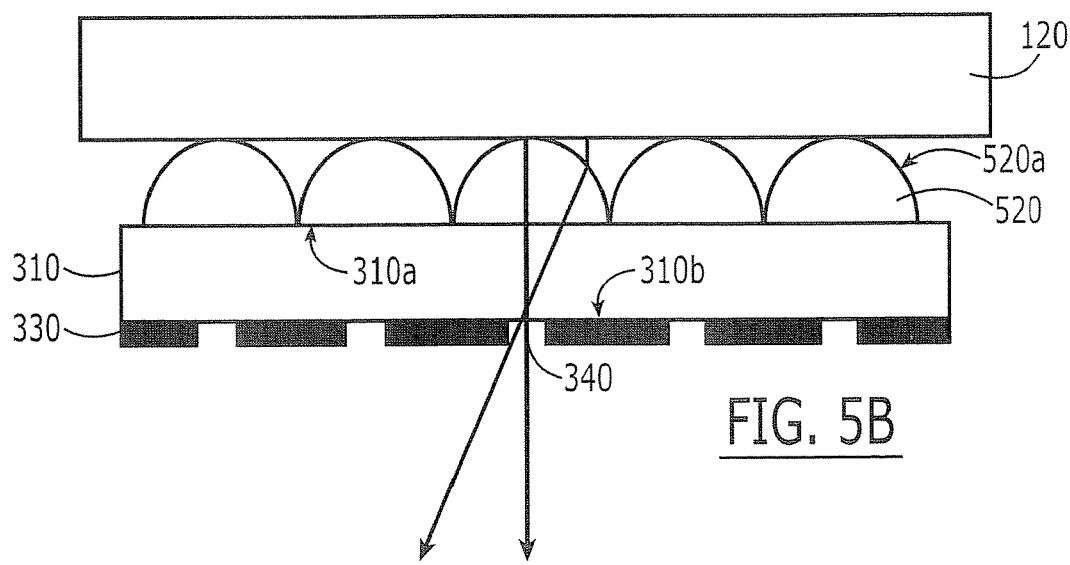

FIGS. 5A and 5B are cross-sectional views of other embodiments of the present invention from a structural and optical perspective, respectively. In these embodiments, the optical microstructures 520 include an adhesive surface 520a that is configured to mount the contrast enhancement film on the direct-view display panel 120, to extend between the direct-view display panel 120 and the outer panel. In other respects, the optical microstructures 520 can be similar to the optical microstructures 320 described above.

A contrast enhancement film as shown in FIGS. 5A and 5B may be prepared by microreplicating an optical microstructure layer 520 on one side 310a of a transparent polyester film 310 with thickness of 50 μm. Other substrate materials that could be used include polycarbonate film, acrylic film, acetate film and glass, among others. The lens-like projections may be fabricated as described in published U.S. Patent Application Nos. 2005/0058947; 2005/0058948; 2005/0058949 and/or 2003/00206342; and/or U.S. Pat. Nos. 6,967,779; 6,788,460; 6,829,087 and/or 6,816,306, the disclosures of which are hereby incorporated herein by reference in their entirety as if set forth fully herein. Other techniques and materials may be used for replicating the microstructures 520. Some of these include injection molding, embossing, calendaring, thermoplastic and thermoset resins, and room temperature vulcanizing one-part and two-part systems.

The photopolymer chosen for the microstructures 520 may be of a type typically used for the formation of Pressure-Sensitive Adhesives (PSA), wherein the cured or partially cured polymer retains adhesive "tack" and can thereby create adhesion between two substrates in which one or both substrates has been coated with a PSA layer. The surface 310b opposite the optical microstructure may be coated with a 4 μm thickness of carbon black 330 in an organic binder. Other light-absorbing layers can be used such as titanium carbide, tantalum nitride, anodized aluminum, and/or the like. The carbon black layer may be exposed to high-energy laser pulses with a wavelength of 1.0 μm from a YAG laser source, with the laser impinging on the optical microstructure side. The optical microstructures cause localized convergence of laser light in "bright" zones that are in registry with individual optical microstructures. Areas between bright zones are "shadow" zones where exposure intensity it much lower than in "bright" zones. The carbon film in the bright zones is ejected due to absorption of laser energy, forming a transmissive aperture corresponding to the bright zone. The apertures may be fabricated as described in U.S. Pat. No. 6,967,779 and/or 4,172,219. The contrast enhancement film thus produced is then adhesively mounted on the surface of a Lambertian-like display 120 by laminating the film to the surface, with the optical microstructures 520 toward the display 120. Adhesive tack in the optical microstructures 520 creates adhesion between the contrast enhancement film and the display surface.

Attachment of the film through the upper-most surface 520a ("tips") of the projecting optical microstructures 520 allows adhesive bonding to be achieved without the need to fill in the spaces around the optical microstructures. This in turn leaves an air gap in the areas of the optical microstructures, creating the desired optical refraction.

Contrast enhancement films of FIGS. 5A/5B may have a potential advantage of ease of mounting, and may provide enhanced display viewability due to potentially better ambient light absorption and contrast.

Figure 6A:
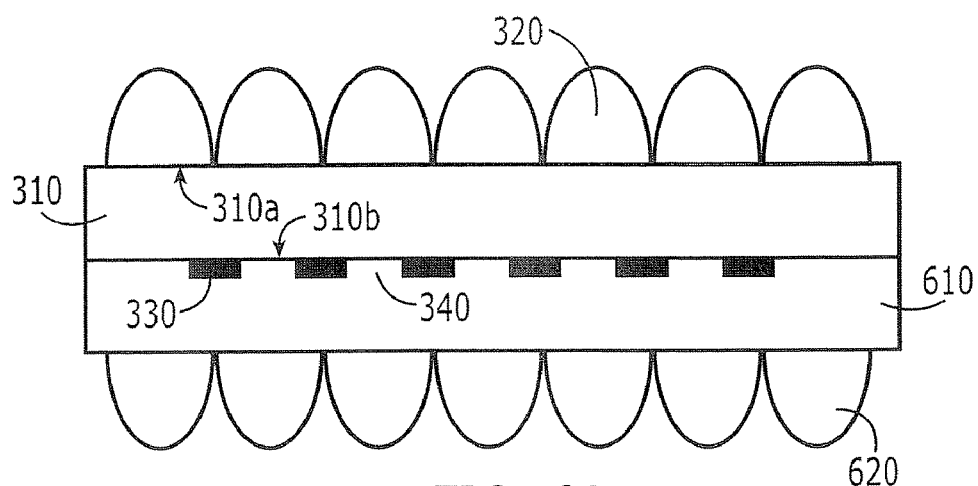
Figure 6B:
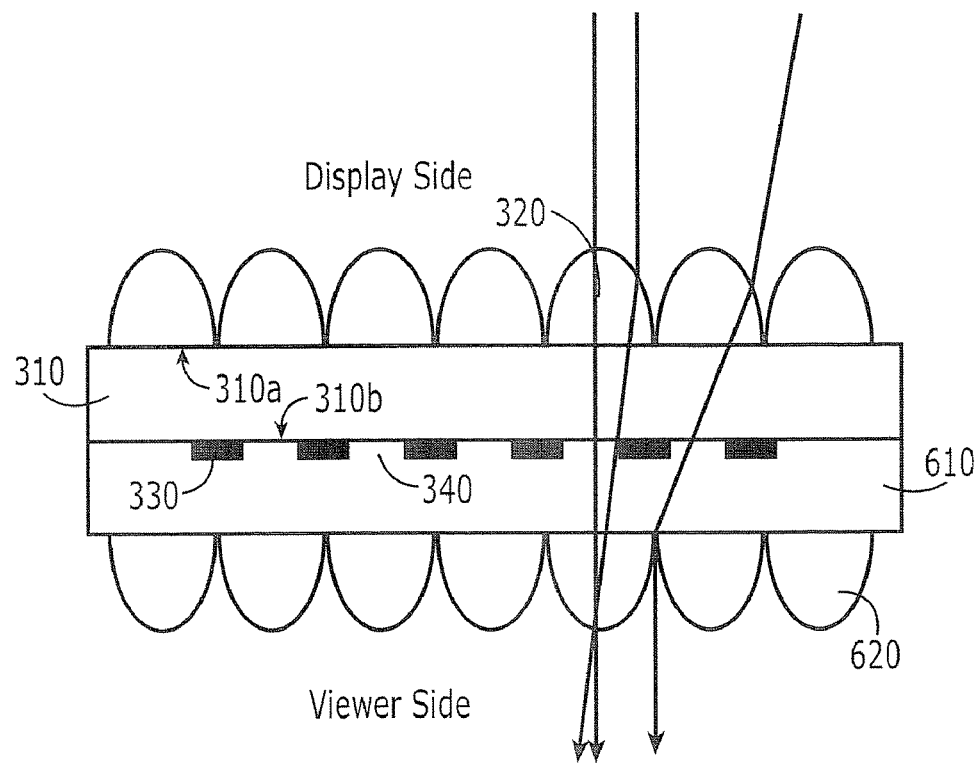

FIGS. 6A and 6B are cross-sectional views of contrast enhancement films according to still other embodiments of the present invention from a structural and optical perspective, respectively.

A contrast enhancement film as shown in FIGS. 6A/6B may be prepared by microreplicating an optical microstructure layer 320 on one side 310a of a first sheet 310 of 50 μm transparent polyester having a 4 μm thick carbon black light absorbing layer 330 on the opposite surface 310b. The lens-like projections may be fabricated as described in published U.S. Patent Application Nos. 2005/0058947; 2005/0058948; 2005/0058949 and/or 2003/00206342; and/or U.S. Pat. Nos. 6,967,779; 6,788,460; 6,829,087 and/or 6,816,306, the disclosures of which are hereby incorporated herein by reference in their entirety as if set forth fully herein. Other substrate materials that could be used include polycarbonate film, acrylic film, acetate film and glass, among others. Other techniques and materials may be used for replicating the microstructures. Some of these include injection molding, embossing, calendaring, thermoplastic and thermoset resins, and room temperature vulcanizing one-part and two-part systems. Other light absorbing layers 330 can be used such as titanium carbide, tantalum nitride, anodized aluminum, and/or the like.

The carbon black layer 330 may be exposed to high-energy laser pulses with a wavelength of 1.0 µm from a YAG laser source, with the laser impinging on the optical microstructure side. The optical microstructures cause localized convergence of laser light in "bright" zones that are in registry with individual optical microstructures. Areas between bright zones are "shadow" zones where exposure intensity is much lower than in "bright" zones. The carbon film in the bright zones is ejected due to absorption of laser energy, forming a transmissive aperture corresponding to the bright zone. The apertures 340 may be fabricated as described in U.S. Pat. Nos. 6,967,779 and/or 4,172,219.

A second substrate or sheet 610 may be prepared by microreplicating optical microstructures 620 identical to the first microstructures 320 on one side of a 50 µm thick transparent polyester sheet 610. The first sheet 310 is adhesively attached to the second sheet 610 with the optical microstructure layers 320, 620 of the first and second sheets facing outwards, and the carbon layer 330 sandwiched between the sheets. The attachment of the first and second sheets may be done in a manner that results in alignment of optical microstructures on the first sheet with optical microstructures on the second sheet.

The resulting film can produce both contrast enhancement and collimation of image light from a Lambertian source. The film is bidirectional, i.e. either side may face the display.

Figure 7A:
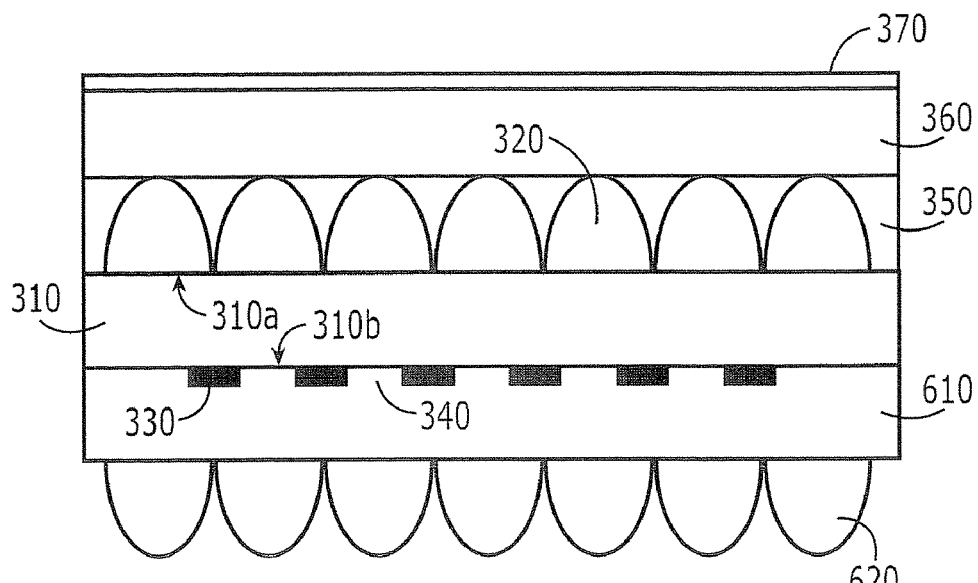
Figure 7B:
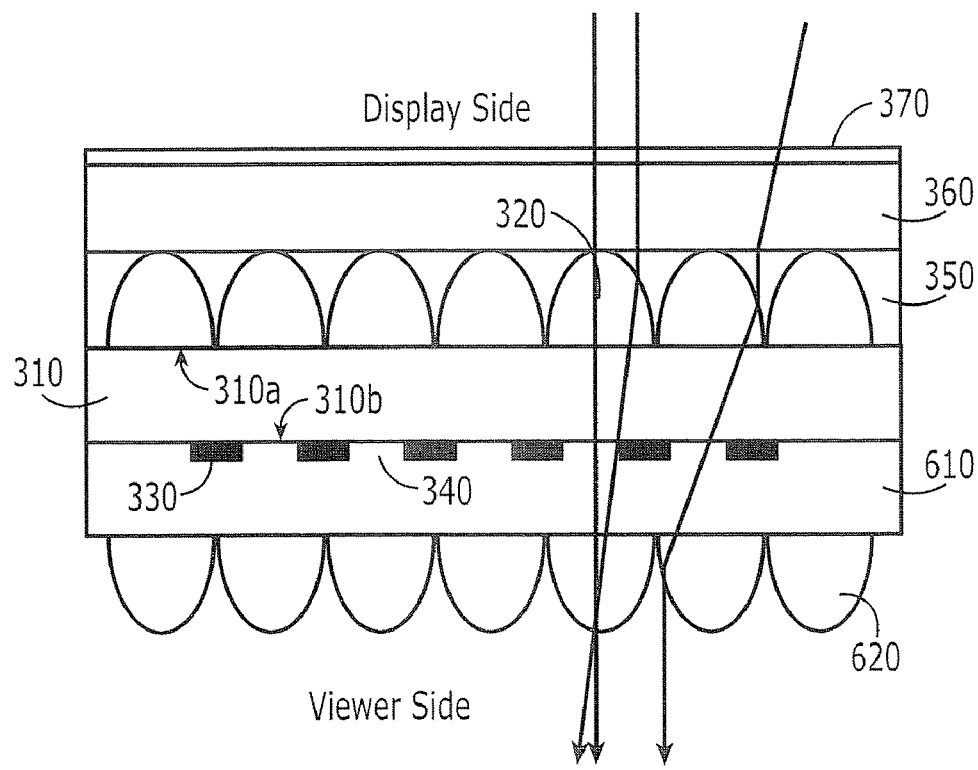

FIGS. 7A and 7B are cross-sectional views of still other contrast enhancement films according to still other embodiments of the present invention, from a structural and optical perspective, respectively.

A contrast enhancement film as shown in FIGS. 7A/7B may be prepared by microreplicating an optical microstructure layer 360 with index of 1.5 on one side of a first sheet 310 of 50 µm transparent polyester having a 4 µm thick carbon black light absorbing layer 330 on the opposite surface. The lens-like projections 320 may be fabricated as described in published U.S. Patent Application Nos. 2005/0058947; 2005/0058948; 2005/0058949 and/or 2003/00206342; and/or U.S. Pat. Nos. 6,967,779; 6,788,460; 6,829,087 and/or 6,816,306, the disclosures of which are hereby incorporated herein by reference in their entirety as if set forth fully herein. Other substrate materials that could be used include polycarbonate film, acrylic film, acetate film and glass, among others. Other light absorbing layers 330 can be used such as titanium carbide, tantalum nitride, anodized aluminum, and/or the like.

This optical microstructure layer may be over-layered with a planar cladding layer 350 having a refractive index of about 1.4 by flowing a room temperature-vulcanizing silicone composition between the optical microstructure layer and a planar sheet of polyester having a thickness of about 175 µm followed by curing at room temperature. Other cladding materials that may be used include higher index polymers such as polystyrene, novolak resin, polyhydroxystyrene, polycarbonates and polysulfones; and lower refractive index materials such as various siloxane-containing polymers and fluoro- and perfluoroacrylate polymers and copolymers.

The carbon black layer 330 may be exposed to high-energy laser pulses with a wavelength of 1.0 µm from a YAG laser source, with the laser impinging on the optical microstructure side. The optical microstructures cause localized convergence of laser light in "bright" zones that are in registry with individual optical microstructures. Areas between bright zones are "shadow" zones where exposure intensity it much lower than in "bright" zones. The carbon film in the bright zones is ejected due to absorption of laser energy, forming a transmissive aperture 340 corresponding to the bright zone. The apertures may be fabricated as described in U.S. Pat. Nos. 6,967,779 and/or 4,172,219.

A second sheet 610 may be prepared by microreplicating optical microstructures 620 identical to that of the first microstructures 360 on one side of a 50 µm thick transparent polyester sheet 610. Other substrate materials that could be used include polycarbonate film, acrylic film, and acetate film and glass, among others. The first sheet 310 may be adhesively attached to the second sheet 610 with the optical microstructure layers 320, 620 facing outwards, and the carbon layer 330 sandwiched between the sheets. A conventional transparent photopolymerizable adhesive 370 may be used for attachment of the sheets. Any transparent adhesive may be suitable. The attachment of the first and second sheets may be done in a manner that results in alignment of optical microstructures on the first sheet with optical microstructures on the second sheet.

The film thus produced may be adhesively mounted on the surface of a Lambertian-like display using a transparent adhesive 370, with the cladding layer 350 facing the display. The film can produce an enhancement of contrast and partial collimation of display light toward the viewer.

Figure 8A:
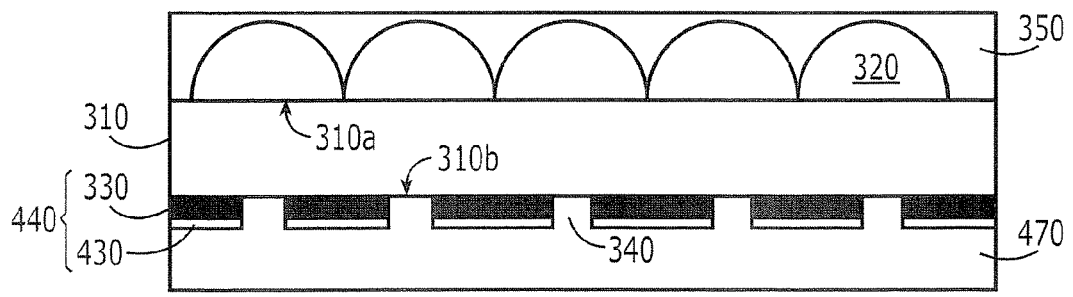
Figure 8B:
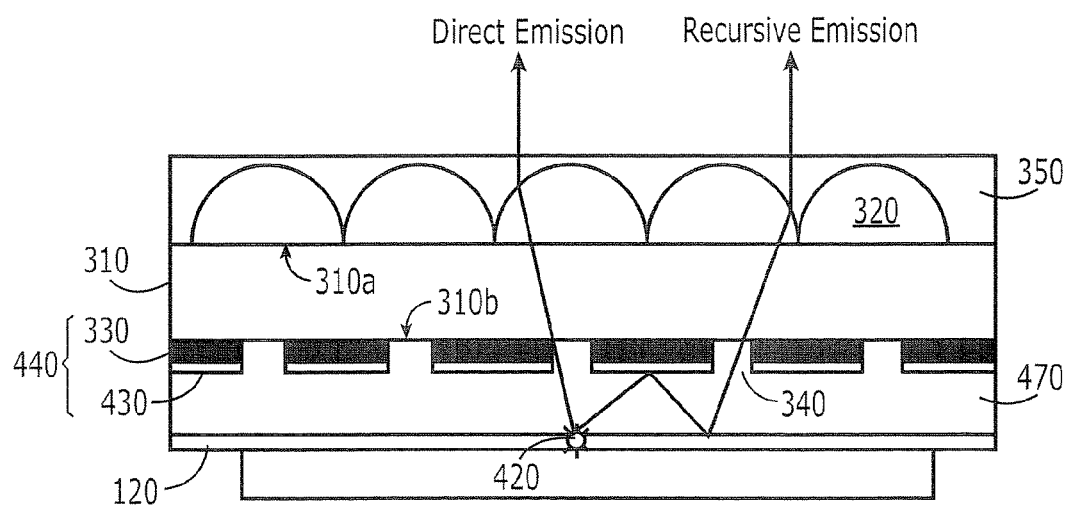

FIGS. 8A and 8B are cross-sectional views of contrast enhancement films according to still other embodiments of the present invention from a structural and optical perspective, respectively. Embodiments of FIGS. 8A and 8B correspond to embodiments of FIGS. 4A and 4B, except that a cladding layer 350 is added. Accordingly, a repetition of the description will not be provided for the sake of brevity.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A contrast enhancement film in combination with direct-view display having a direct-view display panel and an outer panel that provides an outer surface for the direct-view display, the contrast enhancement film comprising:
   a substrate having first and second opposing sides;
   an array of optical microstructures on the first side of the substrate to define a nonplanar surface;
   an optically blocking film including an array of apertures therein on the second side of the substrate, wherein the array of apertures are in registry with the array of optical microstructures; and
   an adhesive layer on the substrate with the contrast enhancement film mounted on the direct-view display panel between the direct-view display panel and the outer panel.

2. A contrast enhancement film according to claim 1 wherein the array of optical microstructures comprises an array of horizontally extending lenticular microlenses.

3. A contrast enhancement film according to claim 1 wherein the contrast enhancement film further comprises:
   a cladding layer on the nonplanar surface of the optical microstructures, the cladding layer including a planar surface opposite the nonplanar surface of the optical microstructures.

4. A contrast enhancement film according to claim 3 wherein the cladding layer has different index of refraction than the optical microstructures.

5. A contrast enhancement film according to claim 1 wherein the optically blocking film comprises a black layer including the array of apertures therein.

6. A contrast enhancement film according to claim 5 wherein the optically blocking film further comprises a reflective layer including the array of apertures therein, on the black layer opposite the substrate.

7. A contrast enhancement film according to claim 1 wherein the array of optical microstructures is an array of first optical microstructures and wherein the contrast enhancement film further comprises a second array of optical microstructures on the optically blocking film, opposite the array of first optical microstructures, to define a nonplanar surface.

8. A contrast enhancement film according to claim 1 wherein the nonplanar surface of the array of optical microstructures includes an adhesive surface that provides the adhesive layer that is configured to mount the contrast enhancement film on the direct view display panel between the direct-view display panel and the outer panel.

9. A contrast enhancement film according to claim 6 wherein the reflective layer comprises conductive material that is configured to suppress electromagnetic interference that is emitted by the direct-view display panel.

10. A contrast enhancement film according to claim 6 wherein the reflective layer comprises conductive material that is configured to carry electric signals that are used to operate the direct-view display panel.

11. A contrast enhancement film according to claim 1 wherein the direct-view display panel is configured to emit Lambertian optical radiation and wherein the contrast enhancement film is configured to convert the Lambertian optical radiation to at least partially collimated radiation.

12. A contrast enhancement film for a direct-view display having a direct-view display panel and an outer panel that provides an outer surface for the direct-view display, the contrast enhancement film comprising:
   a substrate having first and second opposing sides;
   an array of optical microstructures on the first side of the substrate to define a nonplanar surface;
   a black layer including an array of apertures therein on the second side of the substrate;
   a reflective layer including the array of apertures therein, on the black layer opposite the substrate;
   a cladding layer on the nonplanar surface of the optical microstructures, the cladding layer including a planar surface opposite the nonplanar surface of the optical microstructures; and
   an adhesive layer on the reflective layer that is configured to mount the contrast enhancement film on the direct-view display panel between the direct-view display panel and the outer panel.

13. A contrast enhancement film according to claim 12 wherein the array of optical microstructures comprises an array of horizontally extending lenticular microlenses.

14. A contrast enhancement film according to claim 12 wherein the cladding layer has different index of refraction than the optical microstructures.

15. A contrast enhancement film according to claim 12 wherein the reflective layer comprises conductive material that is configured to suppress electromagnetic interference that is emitted by the direct-view display panel.

16. A contrast enhancement film according to claim 12 wherein the reflective layer comprises conductive material that is configured to carry electric signals that are used to operate the direct-view display panel.

17. A contrast enhancement film according to claim 12 wherein the direct-view display panel is configured to emit Lambertian optical radiation and wherein the contrast enhancement film is configured to convert the Lambertian optical radiation to at least partially collimated radiation.

18. A contrast enhancement film according to claim 12 in combination with the direct-view display panel and the outer panel that provides an outer surface for the direct-view display, wherein the adhesive layer is adhesively attached to the direct-view display panel between the direct-view display panel and the outer panel.

19. A contrast enhancement film in combination with direct-view display having a direct-view display panel and an outer panel that provides an outer surface for the direct-view display, the contrast enhancement film comprising:
   a substrate having first and second opposing sides;
   an array of optical microstructures on the first side of the substrate to define a nonplanar surface;
   a black layer including an array of apertures therein on the second side of the substrate; and
   an adhesive layer on the black layer with the contrast enhancement film mounted on the direct-view display panel between the direct-view display panel and the outer panel.

20. A contrast enhancement film according to claim 19 further comprising:
   a cladding layer on the nonplanar surface of the optical microstructures, the cladding layer including a planar surface opposite the nonplanar surface of the optical microstructures.

21. A contrast enhancement film according to claim 19 wherein the array of optical microstructures comprises an array of horizontally extending lenticular microlenses.

22. A contrast enhancement film according to claim 20 wherein the cladding layer has different index of refraction than the optical microstructures.

23. A contrast enhancement film according to claim 19 wherein the direct-view display panel is configured to emit Lambertian optical radiation and wherein the contrast enhancement film is configured to convert the Lambertian optical radiation to at least partially collimated radiation.

24. A contrast enhancement film for a direct-view display having a direct-view display panel and an outer panel that provides an outer surface for the direct-view display, the contrast enhancement film comprising:
   a substrate having first and second opposing sides;
   an array of optical microstructures on the first side of the substrate to define a nonplanar surface;
   an optically blocking film including an array of apertures therein on the second side of the substrate, wherein the array of apertures are in registry with the array of optical microstructures;
   an adhesive layer on the substrate that is configured to mount the contrast enhancement film on the direct-view display panel between the direct-view display panel and the outer panel; and
   a bonding substrate on the nonplanar surface of the array of microstructures opposite the substrate;
   wherein the adhesive layer is on the bonding substrate.

25. A contrast enhancement film for a direct-view display having a direct-view display panel and an outer panel that provides an outer surface for the direct-view display, the contrast enhancement film comprising:
   a substrate having first and second opposing sides;
   an array of optical microstructures on the first side of the substrate to define a nonplanar surface;

an optically blocking film including an array of apertures therein on the second side of the substrate, wherein the array of apertures are in registry with the array of optical microstructures;

an adhesive layer on the substrate that is configured to mount the contrast enhancement film on the direct-view display panel between the direct-view display panel and the outer panel;

a cladding layer on the nonplanar surface of the optical microstructures, the cladding layer including a planar surface opposite the nonplanar surface of the optical microstructure; and a bonding substrate on the cladding layer opposite the substrate;

wherein the adhesive layer is on the bonding substrate.

26. A contrast enhancement film for a direct-view display having a direct-view display panel and an outer panel that provides an outer surface for the direct-view display, the contrast enhancement film comprising:

a substrate having first and second opposing sides;

an array of optical microstructures on the first side of the substrate to define a nonplanar surface; and an optically blocking film including an array of apertures therein on the second side of the substrate, wherein the array of apertures are in registry with the array of optical microstructures;

the contrast enhancement film being configured to mount between the direct-view display panel and the outer panel;

wherein the optically blocking film comprises a black layer including the array of apertures therein;

wherein the optically blocking film further comprises a reflective layer including the array of apertures therein, on the black layer opposite the substrate; and wherein the reflective layer comprises conductive material that is configured to suppress electromagnetic interference that is emitted by the direct-view display panel.

27. A contrast enhancement film for a direct-view display having a direct-view display panel and an outer panel that provides an outer surface for the direct-view display, the contrast enhancement film comprising:

a substrate having first and second opposing sides;

an array of optical microstructures on the first side of the substrate to define a nonplanar surface; and an optically blocking film including an array of apertures therein on the second side of the substrate, wherein the array of apertures are in registry with the array of optical microstructures;

the contrast enhancement film being configured to mount between the direct-view display panel and the outer panel;

wherein the optically blocking film comprises a black layer including the array of apertures therein;

wherein the optically blocking film further comprises a reflective layer including the array of apertures therein, on the black layer opposite the substrate; and wherein the reflective layer comprises conductive material that is configured to carry electric signals that are used to operate the direct-view display panel.

\* \* \* \* \*

UNITED STATES PATENT AND TRADEMARK OFFICE
CERTIFICATE OF CORRECTION

PATENT NO. : 7,502,169 B2 Page 1 of 1
APPLICATION NO. : 11/364423
DATED : March 10, 2009
INVENTOR(S) : Robert L. Wood It is certified that error appears in the above-identified patent and that said Letters Patent is hereby corrected as shown below:

On Title Page:
Item (54) Title, and Col. 1, Lines 1-3 Title: Please correct title to read -- Contrast Enhancement Films for Direct-View Displays --

In the Claims:
Column 16, Claim 19, Line 10: Please add -- a -- after "in combination with"

Signed and Sealed this

Ninth Day of June, 2009

JOHN DOLL
*Acting Director of the United States Patent and Trademark Office*